United States Patent
Matsuhara

[19]

[11] Patent Number: 5,155,768
[45] Date of Patent: Oct. 13, 1992

[54] SECURITY SYSTEM FOR SOFTWARE

[75] Inventor: Taku Matsuhara, Tokyo, Japan

[73] Assignee: Sega Enterprises, Ltd., Tokyo, Japan

[21] Appl. No.: 667,738

[22] Filed: Mar. 11, 1991

[30] Foreign Application Priority Data

Mar. 16, 1990 [JP] Japan .................... 2-65632

[51] Int. Cl.⁵ .............................. H04L 9/32
[52] U.S. Cl. ........................ 380/23; 380/4;
380/25; 340/825.31; 340/825.34
[58] Field of Search ............ 380/4, 23, 25, 49, 50;
364/200, 900; 395/200, 425, 600, 725;
340/825.31, 825.34

[56] References Cited

U.S. PATENT DOCUMENTS

| | | | |
|---|---|---|---|
| 3,609,697 | 9/1971 | Blevins et al. | 380/4 X |
| 4,128,874 | 12/1978 | Pertl et al. | 380/25 |
| 4,458,315 | 7/1984 | Uchenick | 380/4 |
| 4,462,076 | 7/1984 | Smith, III | 364/200 |
| 4,471,163 | 9/1984 | Donald et al. | 380/4 |
| 4,794,635 | 1/1989 | Nakagawa | 364/900 |
| 4,796,181 | 1/1989 | Wiedemer | 380/4 X |
| 4,849,927 | 7/1989 | Vos | 380/4 X |
| 5,004,232 | 4/1991 | Wong et al. | 380/4 X |

FOREIGN PATENT DOCUMENTS 61-296433 12/1980 Japan .
62-3331 1/1987 Japan .

Primary Examiner—Bernarr E. Gregory

[57] ABSTRACT

A security lock for use with a game machine that displays the content of a game through a video display device. The security lock uses a video game system comprising a means of storage, which stores the game programs as software, that is connected in a flexible manner to the game machine.

The means of storage includes a device for reading a security code stored within said means of storage and for comparing this security code to a separate security identical, the game machine will operate as usual. However, if both codes are not identical, the game machine will not operate.

11 Claims, 3 Drawing Sheets

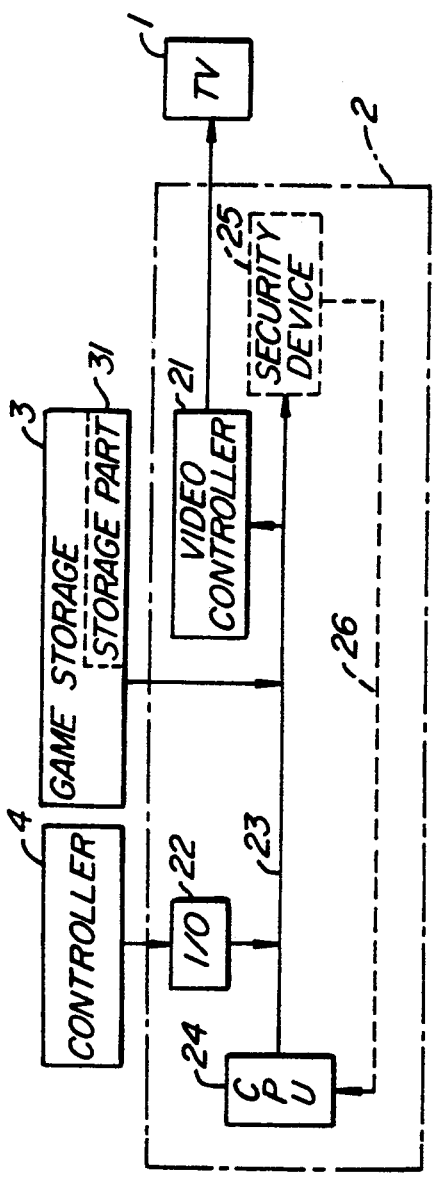
FIG._1.
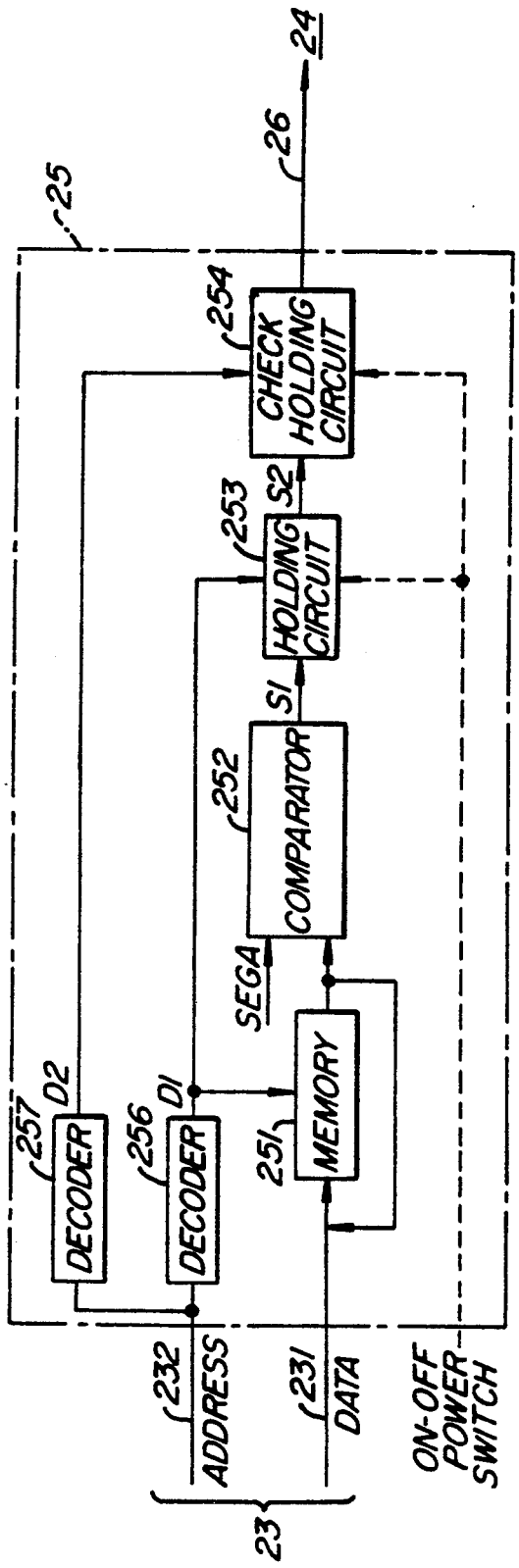
FIG._2.

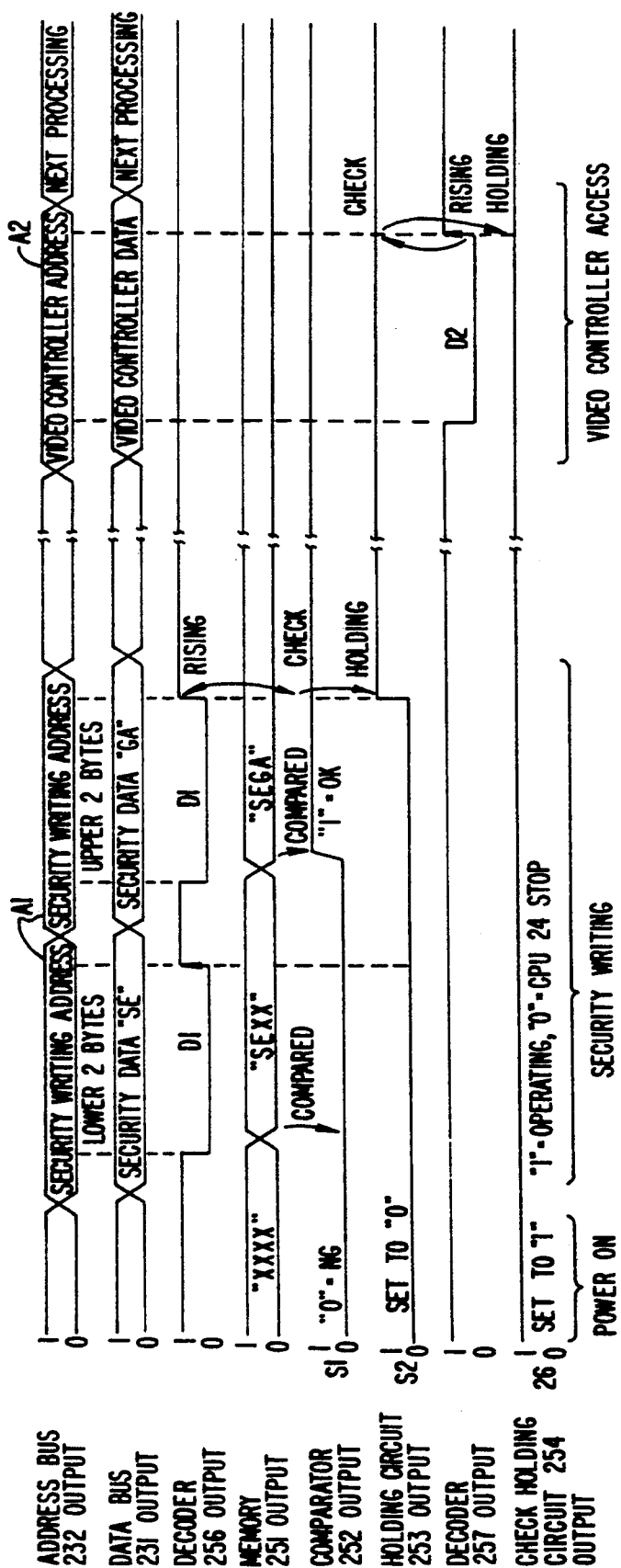
FIG._3.

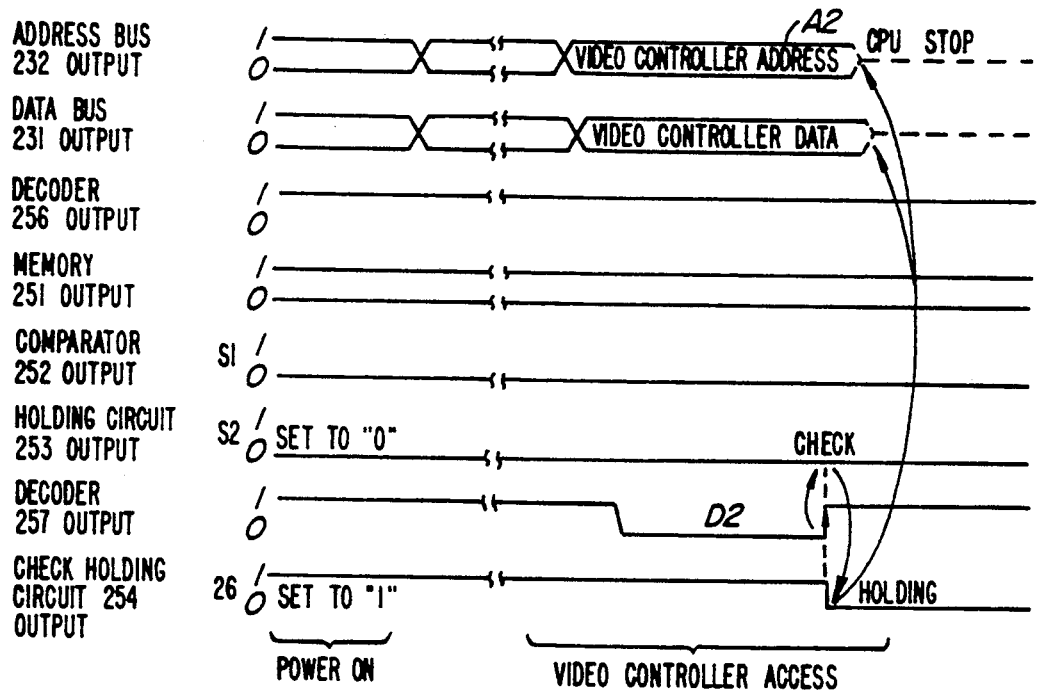
FIG._4.

& # x20;

SECURITY SYSTEM FOR SOFTWARE

BACKGROUND OF THE INVENTION

This invention relates to a means of storage for a software program connected in a flexible manner to a computer, in particular a video game program cartridge. More specifically, this invention relates to a cartridge with flexible connection, having a security system, to determine whether the cartridge/software is an authentic product or not.

Examples of a software control system of an external storage device which function as a means to store software that was used in the past, include patent applications published in the Japanese Patent Disclosures under numbers 61-296433 and 62-3331. Japanese Patent Disclosures 61-296433 and 62-3331 correspond to U.S. Pat. No. 4,799,635.

To summarize the inventions published in the Japanese Patent Disclosures, a software cartridge and a hardware main unit, are provided with the same security chip, so that if the same data is used, control is implemented by the software that operates the main hardware unit.

SUMMARY OF THE INVENTION

This invention was developed with the aim to make it possible to provide a security lock for a means of storage of software, such as a cartridge or a similar device, only through the software used by the means of storage of the software, specifically by using for this purpose only a ROM (read only memory) that is mounted inside the cartridge.

The security lock of this invention is used with a game machine that displays the content of a game through a video display device, and it uses a video game system comprising a means of storage for storing the game programs as software that is connected in a flexible manner to this game machine.

Consequently, according to this invention, it becomes specifically possible to ensure security simply through the ROM that is mounted inside the cartridge, as a means of security that takes advantage of the means to store software in a cartridge or a similar device. At the same time, it is also possible to ensure security of the means to store the software in a manner that corresponds to the progress of the game. In addition, there is no need for software on the side of the game machine, since this security is ensured solely by the hardware, which is an advantage of this invention.

BRIEF DESCRIPTION OF THE DRAWINGS

FIG. 1 is a simplified block diagram of one embodiment of this invention;

FIG. 2 is a block circuit diagram of a security part according to an embodiment of the present invention;

FIG. 3 is a timing chart explaining operation of the security part according to an embodiment of the present invention; and FIG. 4 is a timing chart explaining operation of the security part according to an embodiment of the present invention.

DESCRIPTION OF THE PREFERRED EMBODIMENT

FIG. 1 is a block diagram of an embodiment of the present invention. Number 1 of FIG. 1 is a video display device of a TV receiver or a similar device, and 2 is a game machine for video games connected to display device 1. If display is a liquid crystal display (LCD), or a similar type, it can be mounted into game machine 2.

Number 3 is a cartridge or a similar means of storage, which is connected in a flexible manner to game machine 2, and which stores game programs in the form of software. Means of storage 3 can be a compact disk, or it can also be a magnetic tape, a floppy disk, or a similar ROM (read only memory) or RAM (random access memory) device. Means of storage 3 is also provided with a storage part 31 that stores the security code, which is a special code used to ensure security and make the decision whether the cartridge/software is a genuine product or not).

Number 4 is a controller for manual operation, connected to game machine 2, which serves to control the content of the game that is displayed on the screen of display device 1.

Number 21 is a video controller, which forms a part of game machine 2 and connects to display device 1. Reference item 22 is an I/O interface, also forming a part of game machine 2, which is connected to controller 4.

Video controller 21, I/O interface 22, and means of storage 3 of a cartridge or a similar device are connected to a CPU 24 that processes the signal through a bus-line 23. A security device 25 connects to bus-line 23, as well as to CPU 24. Operation of the embodiment of FIG. 1 can now be described using the following application example, in which means of storage 3 of game software, is connected to the game machine 2. When the power source, not shown on the figure, is turned on, CPU 24, or signal processing unit, starts reading a special security code received from storage part 31 of storage means 3, while at the same time the security code is being written to a security device 25. Approximately simultaneously with the writing of this security code the security code is compared with a special security code that has been input in advance into game machine 2. If both security codes are identical, video controller 21 will start operating. One can then use the game machine 2 as usual, since the content of the game will be displayed on display device 1.

If both security codes are not identical, a reset signal 26 will be output to signal processing unit 24 from security device 25, which operates the video controller 21. As a result of this reset signal, the operation of signal processing unit 24 will be stopped, and the content of the game will not be displayed on display device 1.

In other words, the system is such that unless a specific security code from storage part 31 is entered to security machine 25 when accessing video controller 21, which determines whether it is possible to operate the game machine 2, signal processing unit 24 will be brought to a stop.

FIG. 2 shows a block diagram of security device 25. Number 251 on the figure represents a 4 byte memory, connected to a data bus 231, which forms a part of bus-line 23. Memory 251 stores the security code received from storage part 31 of means of storage 3. In addition, an output from memory 251 is connected to the input of memory 251, to enable repeated reading of the output security code in memory 251.

A comparator 252 is connected to the output from memory 251. The memory output is compared to a special security code of, for example, SEGA that is present in game machine 2, and comparator 252 outputs a determination signal S1, determining whether the codes are identical or not. A holding circuit 253 retains the determination signal S1, and is connected to the output from comparator 252.

Number 254 is a check holding circuit, connected to the output of holding circuit 253, and retaining the output signal S2. Finally, the output terminal of check holding circuit 254, which is connected to signal processing unit 24, sends a reset signal 26.

Number 256 on FIG. 2 represents the first decoder, connected to address bus 232, forming a part of bus-line 23. As shown in FIG. 3, when address signal (A1) for input of the security signal is present, decoder 256 sends signal (D1) and (D2) to memory 251 and to holding circuit 253, respectively.

Number 257 on FIG. 2 is the second decoder, connected to address bus 232 forming a part of bus-line 23. As shown in FIG. 3 and FIG. 4, when the address signal (A2) from the video controller 21 is present, decoder 257 sends signal (D2) to check holding circuit 254.

When a power source (not shown) is switched on, as seen in FIG. 3, the output (S2) from holding circuit 253 is set to "0", while at the same time the output 26 of check holding circuit 254 is set to "1", so that signal processing unit 24 of the CPU enables support of normal operations.

In this mode, when the address signal (A1) of the writing of the security code is present, as in the code signal "SEGA" of the security data, the code signal, for example, "SEGA" is written to memory 251 by the output signal (D1) of decoder 256, while at the same time it is compared to the special security code SEGA of game machine 2, and if these codes match, the output (S1) of the comparator 252 will be changed to "1", and retained in the holding circuit 253 through the output signal (D1) of decoder 256. See FIG. 3.

Furthermore, as seen in FIG. 3, the address signal (A1) is divided into two signals. Since signal processing unit 24 of the CPU was designed for 16 bits, if the security data is for instance "SEGA", a 2 byte division is required.

When address signal (A2) from video controller 21 is present, as is shown on the right side of FIG. 3, the output (S2) of the holding circuit 253 is checked by the output signal (D2) of decoder 257, and retained by check holding circuit 254.

In other words, when the output (S2) of holding circuit 253 is "1", it will be retained by check holding circuit 254. When output 26 of check holding circuit 254 is retained as "1", signal processing unit 24 of the CPU supports normal operation.

When there is a different situation than the one described above, for instance when the code signal written to memory 251 differs from the security code SEGA that is held by game machine 2, as seen in FIG. 4, the result is that the output (S1) of comparator 252 and the output (S2) of holding circuit 253 are retained as "0", and when the address signal (A2) of the video controller 21 is present, the output signal (S2) of holding circuit 253 will be checked by the output signal (D2) of decoder 257, and held by check holding circuit 254. In other words, when the output (S2) of holding circuit 253 is "0", it will be retained by check holding circuit 254. Specifically, output 26 of check holding circuit 254 will be changed to "0", and signal processing unit 24 of the CPU stops running normal operations.

Consequently, as is clear from the explanation above, each time address signal (A2) of video controller 21 is present, or, to put it another way, each time video controller 21 is accessed, it is possible to check whether the means of storage 3, for instance a cartridge, is genuine or not.

Further, in the middle of game playing, the operations of FIG. 3 may be performed. Therefore, it becomes possible to check whether the means of storage (3) is genuine as the game progresses.

The effect of this invention is that it becomes possible to ensure security and determine if the cartridge/software is a genuine product or not simply through the software or the means of software storage, specifically, simply through the ROM that is mounted inside the cartridge, as a means of security that takes advantage of the means to store software in a cartridge or a similar device. At the same time, another effect of this invention is that it is also possible to ensure security of the means to store the software in a manner that corresponds to the progress of the game. In addition, there is no need for software on the side of the game machine, since this security is ensured solely by the hardware, which is an advantage of this invention.

A preferred embodiment of the present invention has now been described. Variations and modifications will be readily apparent to those of skill in the art. For this reason, the invention should be construed in light of the claims.

What is claimed is:

1. In a game system having a game machine, a game machine CPU and a remote game program stored on a remote storage device flexibly coupled to a bus of the game machine, a security system to verify the authenticity of the remote program comprising:

means for initializing, when said game machine is powered up, a security device contained within said game machine and wherein when said security device is initialized said security device outputs an enable signal to said game machine CPU;

means for reading a first security code stored in a storage part of said remote storage device;

means for addressing said security device;

means for comparing, in said security device said first security code read from said storage part to a second security code read from said game machine, when said security device is addressed; and means for resetting the enable signal output by said security device to a reset signal when said first security code and said second security code do not match whereby said security device outputs said reset signal to said game machine CPU to halt operation of said game machine.

2. In a game system having a game machine with a video display device and a CPU; and having a remote game program and software stored on a remote storage device flexibly coupled to a bus of said game machine, a security system implemented in hardware to verify the authenticity of the remote software comprising:

a storage part, contained with said remote storage device, for storing a first security code;

a video controller, coupled to said bus, for addressing said storage part and a security device containing within said game machine;

said security device having:

i) an input coupled to said bus and an output coupled to said CPU;

ii) a comparator to conduct, when addressed by said video controller, a comparison of said first security code to a second security code stored in said game machine and for outputting an enable signal when said first and second security codes match and for outputting a reset signal to halt operation of said CPU when said first and second security codes do not match; and means, coupled to said security device, for initializing said security device when said game machine is powered up, wherein when said security device is initialized by said means for initializing, said security device outputs said enable signal to aid CPU.

3. In a game system having a game machine with a video display device and a CPU; and having a remote game program stored on a remote storage device removably coupled to a bus of said game machine, a security system to verify the authenticity of the remote program comprising:

a storage part, contained within said remote storage device, for storing a first security code;

a security device, contained within said game machine and having an input coupled to said bus and an output coupled to said CPU, for comparing said first security code read from said storage part to a second security code stored in said game machine and having:
- (i) an address decoder, having an input coupled to said input of said security device for receiving an address, and having an output;
- (ii) a comparator, having a first input for receiving said second security code and a second input coupled to said input of said security device for receiving said first security code, for comparing said first and second security codes and outputting a determination signal when said first and second security codes match;
- (iii) a first holding circuit, having an input coupled to an output of said comparator and to output of said address decoder, wherein when said determination signal is output and an output signal of said address decoder is output, said first holding circuit clears a first value and retains a determination signal value; and
- (iv) a second holding circuit, for holding an enable signal value and having an output coupled to an output of said security device and having an input coupled to an output of said first holding circuit and to said output of said address decoder, wherein when said output signal of said address decoder is asserted and said determination signal value is retained in said first holding circuit, said second holding circuit outputs said enable signal to said CPU, and when said first value is retained in said first holding circuit, said second holding circuit resets said enable signal value to a reset signal value and outputs a reset signal to said CPU.

4. The security system of claim 3 wherein said game machine further comprises:
a video controller to address said security device and said storage part.

5. The security system of claim 4 wherein said memory further comprises a feedback loop from said output of said memory to said input of said memory.

6. In a game system having a game machine with a video display device and a CPU; and having a remote game programs stored on a remote storage device flexibly coupled to a bus of said game machine, a security system to verify the authenticity of the remote program comprising:

a storage part, contained within said remote storage device, for storing a first security code;

a security device, contained with said game machine and having an input coupled to said bus and an output coupled to said CPU, for comparing said first security code read from said storage part to a second security code stored in said game machine and having;
- i) a first decoder, having an input coupled to said input of said security device for receiving a first address, and having an output;
- ii) a second decoder, having an input coupled to said input of said security device for receiving a second address, and having an output;
- iii) a memory, having an input coupled to said input of said security device and said output of said first decoder, for storing said first security code;
- iv) a comparator, having an input coupled to receive said second security code and to an output of said memory to receive said first security code, for comparing said first and second security codes and asserting a determination signal when said first and second security codes match;
- v) a first holding circuit, having an input coupled to an output of said comparator and to an output of said first decoder, wherein when said determination signal is asserted and an output signal of said first decoder is asserted, first aid holding circuit clears a first value and retains a determination signal value; and
- vi) a second holding circuit set to an enable signal value and, having an output coupled to an output of said security device and having an input coupled to an output of said first holding circuit and to said output of said second decoder, wherein when an output signal of said second decoder is asserted and said determination signal value is retained in said first holding circuit, said second holding circuit outputs an enable signal to said CPU, and when said first value is retained in said first holding circuit, said second holding circuit resets said enable signal value to a reset signal value and outputs a reset signal to said CPU.

7. The security system of claim 6 wherein said game machine further comprises:
a video controller to address said security device and said storage part.

8. A method for verifying an authenticity of a remote means of storage flexibly connected to a game machine used in a video game system comprising the steps of:

initializing, when said game machine is powered up, a security device contained within said game machine is powered up, a security device contained within said game machine to output an enable signal to a CPU of said game machine;

reading a first security code stored in a storage part of said remote means of storage;

comparing, in said security device said first security code read from said storage part to a second security code read from said game machine and resetting said security device to output a reset signal from to said CPU of said game machine to halt continued operation of said game when said first security code and said second security code do not match.

9. A method for verifying an authenticity of a remote means of storage flexibly connected to game machine used in a video game system comprising the steps of:
 reading a first security code stored in a storage part of said remote means of storage;
 comparing, in a security device contained within the game machine, said first security code read from said storage part to a second security code read from said game machine; and
 outputting an enable signal from said security device to a CPU of said game machine to permit operation of said game when said first security code and said second security code match.

10. A method for verifying an authenticity of a remote means of storage flexibly connected to a game machine used in a video game system comprising the steps of:
 setting a first holding circuit to a first value when said game machine is powered up;
 reading a first security code stored in a storage part of said remote means of storage;
 storing said first security code read from said remote means of storage in a memory of said game machine;
 comparing said first security code stored in said memory to a second security code read from said game machine and asserting a determination signal when said first and second security codes match;
 setting a second holding circuit to a second value when said game machine is powered up;
 resetting said first holding circuit to a determination signal value when said determination signal is asserted and said output from said first decoder is asserted and outputting said determination signal to said second holding circuit; and
 retaining in said second holding circuit to said second value when said determination signal is output from said first holding circuit and to said output from said second decoder is asserted and outputting an enable signal from said second holding circuit to a CPU of said game machine to permit operation of said video game system.

11. The method of claim 10 further comprising the steps of:
 maintaining said first value in said first holding circuit when said determination signal is deasserted and said output from said first decoder is asserted; and
 resetting said second holding circuit to a reset signal value when said determination signal is deasserted and said output from said second decoder is asserted and outputting a reset signal to said CPU to halt operations of said CPU.

* * * * *